2,945,843
PENTACHLOROPHENYLTHIOACRYLATES AND POLYMERS THEREOF

Ardy Armen, Concord, and Robert E. Gentry, Jr., Pleasant Hill, Calif., assignors to The Dow Chemical Company, Midland, Mich., a corporation of Delaware No Drawing. Filed Mar. 28, 1957, Ser. No. 649,261

10 Claims. (Cl. 260—79.7)

This invention relates to certain novel unsaturated esters of pentachlorothiophenol and more particularly it relates to pentachlorophenylthioacrylate and pentachlorophenylthiomethacrylate. Merely for purposes of convenience, the former material will be referred to herein by means of the abbreviation "PCPTA" and the latter by "PCPTMA."

The utility of many organic thermoplastic materials is sometimes limited to a great extent by their combustible characteristics. Attempts are often made to render such materials non-flammable by blending non-combustible modifiers therewith, such as the phosphate plasticizers or high halogenated materials, including tetrabromobutane and the like. Frequently, however, the employment of such additives tends to soften or weaken the plastic product, as for example, by depressing its second order transition temperature. As is apparent, such results may render the composition less attractive for many applications than the unmodified, combustible parent plastic.

It would be desirable, and it is among the principal objectives of the present invention, to provide a new plastic or polymeric substance which would not support combustion. A related object is to provide a readily polymerizable non-combustible monomeric material from which non-combustible polymeric products, including homopolymer, copolymer and graft copolymer blends could be made. A further object is to provide such polymeric products which have high second order transition points relative to those of polymers derived from chemically similar, but combustible, monomeric materials. A specific object of the present invention is to provide the new monomeric compounds pentachlorophenylthioacrylate (PCPTA) and pentachlorophenylthiomethacrylate (PCPTMA).

The new monomeric materials which possibilitate the achievement of the above indicated and corollary objects, according to the present invention, are provided by a simple synthesis of pentachlorothiophenylacrylate or methacrylate and, if desired, the subsequent utilization of these monomers in the formation of new polymeric products.

PCPTA may be obtained by any of several methods one of the most satisfactory involving the reaction between an alkali metal salt of pentachlorothiophenate such as the sodium salt thereof and the corresponding acyl halide in an aqueous medium. Thus, acrylyl chloride or methacrylyl chloride or the corresponding bromides may be added to a stirred aqueous solution of sodium pentachlorothiophenate at normal room temperatures in order to form the desired product. The monomeric product of the reaction is insoluble in water and may be separated from the reaction mass by filtration or decantation techniques prior to being washed and dried. In many cases it may be advantageous to purify the monomeric product by recrystallization from a suitable solvent, such as a low molecular weight aliphatic alcohol. A corresponding reaction may be carried out using organic solvents as the reaction medium in which case it may be necessary to remove the solvent by distillation procedures. Suitable solvents for such purposes include benzene, toluene, dioxane, diethyl ether and the like.

PCPTA is a solid having a melting point of 101 to 103° C. PCPTMA is a solid material that melts at 98 to 100° C. Both of the products are micro-crystalline in nature.

The new monomeric esters, as is apparent, are insoluble in water. They, however, are slightly soluble in ethanol and are readily soluble in benzene. They do not support combustion. This is the case when they are present in their monomeric form or as converted to a homopolymer or to a copolymer with other monomeric materials which contains at least about 21 percent by weight of combined chlorine in the product copolymer molecule.

The novel monomeric thioesters of the present invention undergo polymerization and copolymerization when subjected to most of the conventional procedures for this purpose. This includes bulk polymerization (which is oftentimes referred to as polymerization in mass), as well as polymerization in solution, in non-emulsified aqueous suspension and in aqueous emulsion. Suitable catalysts or initiators of polymerization include the azo catalysts, such as azobisiso-butyronitrile, peroxygen catalysts, such as potassium persulfate, and irradiation under the influence of high energy fields. The latter catalyzation may include the various actinic radiations, such as ultraviolet, X-ray and gamma radiations, as well as radiation from radioactive materials. The polymeric products which may be obtained may be found to vary from high cross-linked and insoluble materials to essentially linear and thermoplastic substances, depending upon the particular conditions of polymerization that are employed and, in some instances, when copolymer products are being made, upon the particular monomers with which the thioesters are copolymerized.

The presence of small amounts of pentachlorothiophenol, which may be developed by slow hydrolysis or dissociation of the esters in storage, may have an inhibiting or retarding effect on polymerization. Because of this, it is preferred to use freshly prepared or purified monomeric PCPTA or PCPTMA in order to manufacture polymeric products therewith. Quantities of the monomeric materials that have been stored for considerable periods may be reactivated, if necessary, by extraction with dilute sodium bicarbonate or other base followed by washing the reactivated material with water and drying.

The invention is further illustrated in and by the following examples.

Example 1.—Preparation of PCPTMA

To a stirred solution of about 28.5 grams (0.1 mole) of pentachlorothiophenol in 250 ml. of water and 30 ml. of 6 N sodium hydroxide at a temperature of 25° C., there was rapidly added about 15 grams (0.16 mole) of methacrylyl chloride. The mixture was stirred for ½ hour and then filtered. The filtered solid monomeric product was washed three times with water and subsequently recrystallized twice from 95 percent ethanol to yield about 9 grams of crystals that melted at a temperature between about 98 and 100° C. The yield of product was estimated to be about 26 percent. Upon analysis for $C_{10}H_5Cl_5OS$, the product was found to contain about 51.1 percent of chlorine and 9.10 percent of sulfur. This compared with theoretical values for the same constituents of about 50.8 and 9.13 percent, respectively.

Example 2.—Preparation of PCPTA

Acrylyl chloride was substituted for the methacrylyl chloride in the procedure of Example 1. There was obtained a 45 percent yield of solid having a melting point of 101 to 103° C.

Calculated for $C_{10}H_5Cl_5OS$: Cl, 52.9; S, 9.50. Found: Cl, 51.6; S, 9.41.

Example 3.—Bulk polymerization of PCPTMA

About 1 gram (0.0029 mole) of PCPTMA was intimately mixed with azobisisobutyronitrile (ABIN) in a stoppered reaction vessel that was flushed with nitrogen after being charged and before being sealed. The catalyzed monomeric charge was heated at 100° C. for about 1¼ hours. The vessel was then opened and the solid reaction product was warmed with benzene and filtered to separate soluble from insoluble polymer. The benzene soluble polymer as precipitated by dilution of the benzene solution was 3 to 5 volumes of 95 percent ethanol. It was then washed with ethanol and dried in air at room temperature. The finally obtained homopolymeric solid had a stick temperature of about 220° C. It could be drawn into short brittle fibers. Upon testing, it was found to not support combustion.

Example 4.—Solution polymerization of PCPTMA

A solution of about 1 gram (0.0029 mole) of PCPTMA and 8 mg. of ABIN in about 2 ml. of benzene was flushed with nitrogen and placed in a small reaction flask. The reaction vessel was sealed and heated at 78 to 80° C. for two hours. The clear solution was then poured into about 10 ml. of a mixture of about 1 part by volume of benzene with two parts by volume of 95 percent ethanol wherein it precipitated to a white polymer product. The polymer was isolated and collected by filtration. It was found to have a reduced viscosity in toluene at 25° C. of 0.054, as determined according to the following equation:

$$\text{"Reduced viscosity"} = \frac{\frac{\text{"sol"}}{x} - 1}{c}$$

wherein "sol" is the viscosity in centipoises at 25° C. of a 0.5 percent by weight solution of the polymer in toluene; $x$ is the viscosity in centipoises at 25° C. of the toluene; and $c$ is the concentration of the polymer in solution. The polymer had a stick temperature of about 220° C. It could be drawn into short brittle fibers. It would not support combustion and also discolored to only a slight degree when heated for 5 minutes at a temperature of 275° C.

Example 5.—Bulk polymerization of PCPTA

PCPTA was polymerized by the procedure of the third example excepting that the monomer and catalyst were heated for about 5 hours. The polymer product that was obtained had a stick temperature of 110° C.; would not support combustion; discolored only slightly when heated for 5 minutes at 250° C.; and could be drawn into short brittle fibers.

Example 6.—Preparation of PCPTMA copolymers

PCPTMA was copolymerized with styrene; acrylonitrile; methylmethacrylate; and a mixture of styrene and acrylonitrile by emulsion techniques. Each of the products was prepared by mixing about 1 gram of the thioester monomer with the other monomer with which it was polymerized in about 10 ml. of water containing about .10 gram of a conventional emulsifying agent and about 25 mg. of potassium persulfate as a catalyst. The ingredients were mixed in a bomb tube and purged with nitrogen therein before the tubes were cooled and sealed. The tubes were then mechanically agitated for about 4 hours while being maintained at a constant temperature of about 75° C. At the termination of the reaction, they were cooled overnight at a temperature of about 20° C., then warmed to room temperature and opened. The emulsions in which the product copolymers were obtained were broken by the addition of sodium chloride to the reaction mass. The product copolymers were subsequently recovered by filtration. The copolymer products were then purified according to the procedure set forth in Examples 4 and 5 with the exception of the ternary copolymer which was insoluble in benzene and was attempted to be purified merely by repeated washings in ethanol and water prior to drying. In the following tabulation there is set forth data relating to the quantity of the monomeric substance that was copolymerized with the thioester, the yield obtained and certain of the physical characteristics of each of the polymer products.

| Copolymer Product | Weight of Comonomer | Percentage Yield | Stick Temperature, ° C. | Remarks |
|---|---|---|---|---|
| "A" | 1.5 grams styrene | 48 | 235 | Could be drawn into short brittle fibers. |
| "B" | 1.5 grams acrylonitrile | (a) | More than 300 | |
| "C" | 1.5 grams methylmethacrylate | 68 | About 300 | Do. |
| "D" | 1.5 grams styrene / 1.5 grams acrylonitrile | (a) | More than 325 | | a Accurate yields could not be obtained for these polymer products due to their contamination with sodium chloride after their isolation from the reaction mass.

Results similar to the foregoing may be obtained when other means are employed for polymerizing the monomers and when PCPTA is utilized in the preparation of various copolymer products.

As has been indicated, the polymeric products do not support combustion when they have a combined chlorine content in excess of about 21 percent by weight. Such a chlorine content is present, for example, when copolymers of either of the thioesters with styrene contain at least about 40 percent by weight of PCPTA or PCPTMA. The copolymers of styrene with 40 or more percent of the monomeric thioesters of the present invention are especially useful in that, in addition to being noncombustible, they ordinarily are found to have second order transition points that are 30 or more centigrade degrees higher than that found in similar polystyrene articles.

The several materials designated in the foregoing as copolymers were found (using such procedures as selective solvent extraction or chemical attack followed by chemical or infra-red analysis of each portion of the so-treated material) to be homogeneous materials that were not comprised of mixtures of homopolymers.

The polymeric products that may be obtained in accordance with the present invention may be blended with other polymers to impart resistance to combustion or to modify such other characteristics, such as solubility or strength, of the articles made from the blends. The new polymers and copolymers, especially those that are obtained in an essentially linear and uncrosslinked form, can be extruded or molded (either separately or in blends with other polymers) according to common and conventional procedures into various desired useful shaped articles, structures and objects, such as boxes, receptibles or containers and the like, using the ordinary apparatus for such purposes that is conventionally employed for the fabrication of thermoplastic resinous material. While plasticizers and stabilizers are not essential to such operations, it may sometimes be beneficial to employ them when their presence is felt to be desirable in order to obtain the benefit of their function in the resulting composition.

Generically, the polymeric forms of the new thioesters of the present invention, whether homopolymers, copolymers or interpolymers, may be said to contain characterizing proportions of the recurring group:

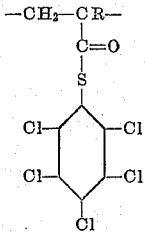

wherein R is hydrogen or methyl.

What is claimed is:

1. A composition of matter comprising a normally solid polymer selected from the group consisting of pentachlorophenylthioacrylate polymers and pentachlorophenylthiomethacrylate polymers, said polymer containing material interpolymerized proportions of the recurring group

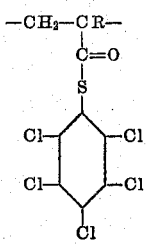

wherein R is selected from the class consisting of hydrogen and methyl.

2. Monomeric pentachlorophenylthioacrylate characterized in being a crystalline solid melting at 101 to 103° C. that is insoluble in water, slightly soluble in ethanol and soluble in benzene.

3. Monomeric pentachlorophenylthiomethacrylate characterized in being a crystalline solid melting at 98 to 100° C. that is insoluble in water, slightly soluble in ethanol and soluble in benzene.

4. The normally solid homopolymer of pentachlorophenylthioacrylate.

5. The normally solid homopolymer of pentachlorophenylthiomethacrylate.

6. The normally solid copolymeric product of the conjoint polymerization of a material proportion of pentachlorophenylthioacrylate with a remaining proportion of a monomer selected from the group consisting of styrene, acrylonitrile and methyl methacrylate.

7. The product of claim 6 wherein the pentachlorophenylthioacrylate is copolymerized with styrene.

8. The normally solid copolymeric product of the conjoint polymerization of a material proportion of pentachlorophenylthiomethacrylate with a remaining proportion of a monomer selected from the group consisting of styrene, acrylonitrile and methyl methacrylate.

9. The product of claim 8 wherein the pentachlorophenylthiomethacrylate is copolymerized with styrene.

10. A composition of matter comprising an ethylenically unsaturated monomer of the structure:

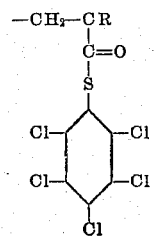

wherein R is selected from the class consisting of hydrogen and methyl.

References Cited in the file of this patent

UNITED STATES PATENTS

| | | |
|---|---|---|
| 2,259,869 | Allen | Oct. 21, 1941 |
| 2,475,246 | Mikeska | July 5, 1949 |
| 2,511,424 | Babayan | June 13, 1950 |
| 2,695,698 | Lober et al. | Nov. 30, 1954 |